(12) United States Patent
Johnson

(10) Patent No.: US 6,265,993 B1
(45) Date of Patent: Jul. 24, 2001

(54) FURLABLE KEYBOARD

(75) Inventor: Thomas Keith Johnson, Gilberts, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/164,833

(22) Filed: Oct. 1, 1998

(51) Int. Cl.[7] .................................................. H03M 11/00
(52) U.S. Cl. ............................. 341/22; 341/20; 345/156; 345/157; 345/368; 382/228; 382/218; 382/317; 382/103
(58) Field of Search ..................... 341/22, 20; 345/358, 345/156, 327, 157; 382/228, 218, 317, 103; 708/138

(56) References Cited

U.S. PATENT DOCUMENTS

| 5,220,521 | 6/1993 | Kikinis ........................... 364/709.08 |
| 5,616,897 | 4/1997 | Weber et al. ....................... 200/5 A |
| 5,666,112 | 9/1997 | Crowley et al. ....................... 341/22 |
| 5,710,833 | * 1/1998 | Moghaddam ....................... 382/228 |
| 5,742,241 | 4/1998 | Crowley et al. ....................... 341/22 |
| 5,821,922 | * 10/1998 | Sellers ................................ 345/157 |
| 5,864,334 | * 1/1999 | Sellers ................................ 345/168 |
| 6,072,494 | * 6/2000 | Nguygen ............................. 345/358 |
| 6,075,895 | * 6/2000 | Qiao et al. ........................... 382/218 |
| 6,083,353 | * 7/2000 | Alexander ........................... 202/158 |
| 6,115,480 | * 9/2000 | Washizawa ......................... 382/103 |
| 6,115,513 | * 9/2000 | Miyazaki ............................ 382/317 |

* cited by examiner

*Primary Examiner*—Michael Horabik
*Assistant Examiner*—Albert K. Wong
(74) *Attorney, Agent, or Firm*—Walter W. Duft

(57) ABSTRACT

A furlable keyboard apparatus includes a generally cylindrical housing and a flexible keyboard mounted to the housing such that the keyboard is furlable around the housing when the keyboard apparatus is not in use. The keyboard has keyboard indicia formed thereon providing a plurality of visual key representations arranged in a plurality of generally horizontal key rows and partially diagonal key columns. A plurality of keystroke signal generators underly the keyboard indicia and are arranged in one-to-one correspondence with the key representions forming the key columns and key rows. The keystroke signal generators are responsive to finger pressure and are interconnected by logical ORing to form key groups providing key group signals whenever a keystroke signal generator underlying one of the key groups is pressed or released. An imaging device is mounted on the housing and is positionable over the keyboard. The imaging device is adapted to generate an output comprising an imaging signal representing a visual image of the keyboard. A keystroke recognizer mounted within the housing activates the imaging device to generate an imaging signal in response to a key group signal being generated by one of the keystroke signal generators, and produces a keystroke output based on the imaging signal and the key group signal. The keystroke output is indicative of one of the key representations being pressed by a user of the keyboard apparatus.

20 Claims, 12 Drawing Sheets

FIG. 7"

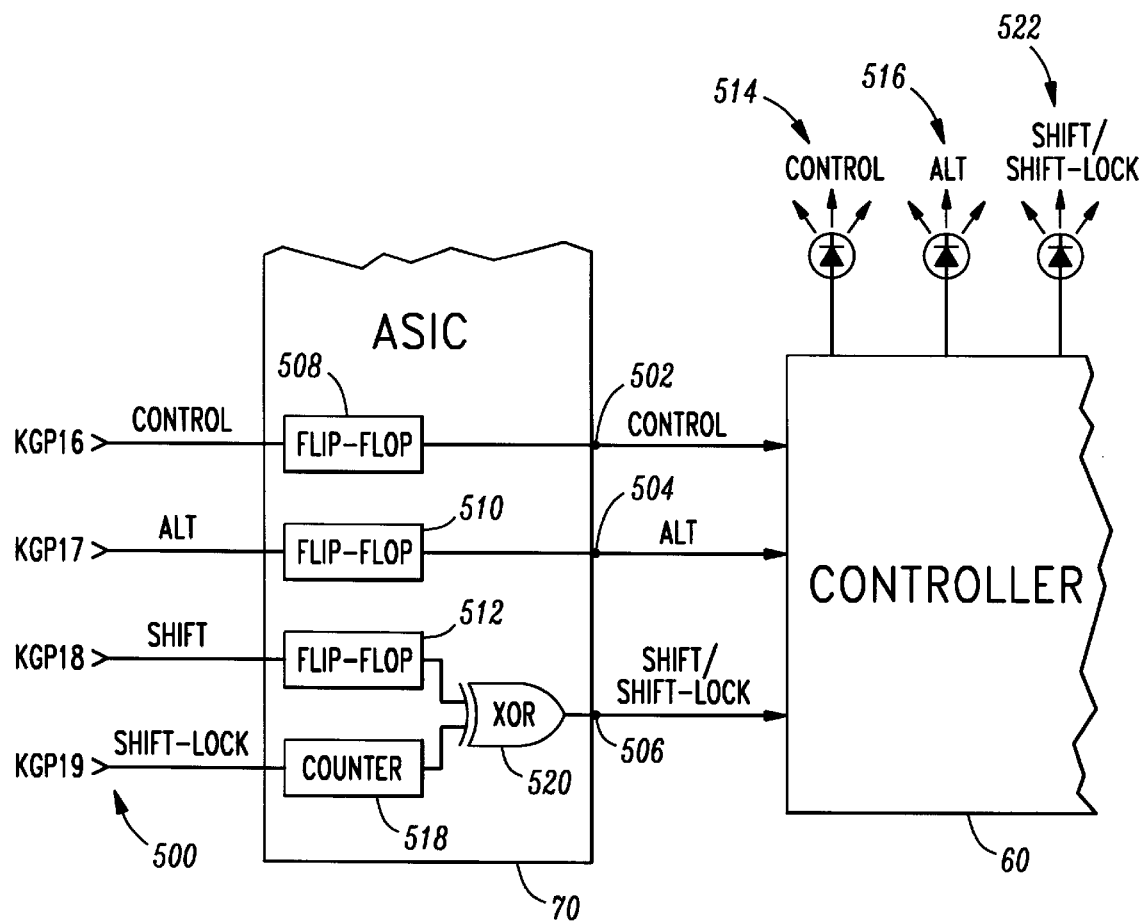

FURLABLE KEYBOARD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to keyboards for personal computers, personal digital assistants, wireless terminals, and other portable digital processing devices. More particularly, the invention concerns a furlable keyboard that can be rolled into an extremely compact cylindrical configuration in order to facilitate portability.

2. Description of the Prior Art

By way of background, there has been an increase in the development and use of portable digital processing devices, including laptop computers, and more recently, personal digital assistants or "PDA"s. These developments have necessarily focused attention on computer keyboards, which are not ordinarily amenable to portable use given their size and shape. Reducing the overall size of the keyboard, as seen in laptop computers, or the number of keys, as seen in PDAs, are two well known approaches to enhancing keyboard portability. Another approach to optimizing keyboard portability resides in the notion of a flexible (or foldable) keyboard.

Flexible keyboards have been described in several prior art patents, including U.S. Pat. No. 5,220,521, entitled "Flexible Keyboard for Computers," U.S. Pat. No. 5,616,897, entitled "Flexible Keyboard," U.S. Pat. No. 5,666,112, entitled "Key for Flexible Keyboard" and U.S. Pat. No. 5,742,241, entitled "Flexible data entry panel."

The foregoing patents describe flexible keyboards that can be folded or rolled into relatively compact shapes in order to facilitate portability. Although each proposal has merit, it is submitted that further improvements in flexible keyboards are possible. More particularly, it has been observed that an unsatisfied need remains for a flexible keyboard that is substantially full size when in use, but which is extremely compact when placed in its transport configuration, and which can be constructed at minimal cost using standard circuit components.

BRIEF SUMMARY OF THE INVENTION

In accordance with the present invention, a furlable keyboard apparatus representing an advance in the keyboard art is provided as a solution to the foregoing problem. The keyboard apparatus includes a generally cylindrical housing, made from plastic or the like, that mounts a flexible keyboard such that the keyboard is furlable around the housing when the keyboard apparatus is not in use. The flexible keyboard includes a flexible base layer for supporting the keyboard on a surface, a flexible intermediate circuit board layer, and a flexible protective upper layer.

A plurality of piezoelectric keystroke signal generators are mounted on the intermediate layer of the flexible keyboard in a pattern of generally horizontal key rows and partially diagonal key columns in accordance with standard QWERTY keyboard design. The keystroke signal generators are responsive to finger pressure and are interconnected by logical ORing to provide key group signals whenever a keystroke signal generator in one of a pre-assigned group of keys (usually a key column) is pressed or released. A plurality of key representations are formed on the flexible keyboard over each of the keystroke signal generators and in one-to-one correspondence therewith. The key representations may be formed on the upper flexible keyboard layer, or directly on the keystroke signal generators, as desired.

A digital camera is mounted on a stalk that is pivotally secured to the housing, such that the camera is positionable over the keyboard. The camera generates an output representing a visual image of the keyboard.

A keystroke recognizer is mounted within the housing and outputs keystroke information to a host whenever a user presses or releases one of the key representations. The keystroke recognizer preferably includes a digital controller that executes a keystroke recognition program. Whenever a key group signal is generated by one of the keystroke signal generators, the recognizer activates the camera to generate an imaging signal. Using the key group signal as a filter, the recognizer compares the imaging signal to a library of pre-stored keyboard patterns and then generates a keystroke signal that is output to the host device.

The keystroke recognizer may further include an interface device formed from a low cost Application Specific Integrated Circuit (ASIC) that is packaged, for example, in a DIP (Dual In-Line) pin configuration. The interface device has key group electrical input connections receiving the key group signals from the keystroke signal generators. The interface device also has logical output connections providing binary key group output values to the controller. The interface device preferably includes either a diode pair or an edge detector associated with each key group input connection for identifying positive and negative key group signals and distinguishing key presses from key releases.

In order to provide sensory response to a user, a miniature speaker may be provided in the housing to produce a click in response to the user pressing one of said key representations. Alternatively, a synthesized voice could be output that recites the character being pressed.

The furlable keyboard apparatus is used by unfurling the flexible keyboard from the housing and placing the keyboard and housing on a flat surface. Retractable legs are provided on the housing for preventing the housing from rolling during keyboard operation. The camera stalk is then extended so that the camera is positioned over the center of the keyboard. The keyboard apparatus is powered by the host device via a standard keyboard plug-in interface cable.

As the keystroke recognizer is powered-up, or when a manual reset button on the housing is pressed, the recognizer captures several images of the typing surface, without the user's hands on the keyboard, and stores the images in memory. The recognizer use these images to initialize the recognition software so that it is able to align the received image with the stored patterns, which it uses to recognize individual keystrokes. An audible "ready" tone may be produced when initialization completes. A "fail" tone may be produced if the initialization fails for any reason. The user may begin typing after the "ready" tone is heard.

When the user presses a key representation, the recognizer captures a keyboard image from the digital camera and determines the key group to which the key representation belongs. Using the key group information as a filter, the recognizer compares the captured keyboard image against a pre-stored library of keyboard patterns corresponding to each possible keystroke that can be made on the flexible keyboard. The key group filter speeds up the comparison process by excluding library patterns that are not within the identified key group. When a match occurs between the captured keyboard image and one of the key group library patterns, the recognizer outputs a conventional keystroke signal to the host device, and the system resets to await the next keystroke.

As an optional enhancement to the furlable keyboard apparatus of the present invention, the keystroke recognizer may be programmed to provide a mouse-mode function. A mouse mode button can be provided on the housing to invoke the mouse mode. A pair of mouse-click buttons are also mounted on the housing to input left and right mouse clicks. To invoke the mouse mode, the user presses the mouse mode button with a finger of one hand (the "click" hand) while moving the other hand (the "pointing" hand) within view of the camera. The recognizer tracks the position of the pointing hand and outputs this information to the host in order to control movement of an on-screen mouse pointer image. The recognizer also outputs mouse clicks from the mouse click buttons in order to provide a full range of mouse functions.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which:

FIGS. 7' and 7" are fragmented views showing a portion of the keystroke recognizer of FIG. 7;

FIG. 11 is a diagrammatic representation showing a modified keystroke recognizer.

DETAILED DESCRIPTION OF THE INVENTION

Figure 1A:
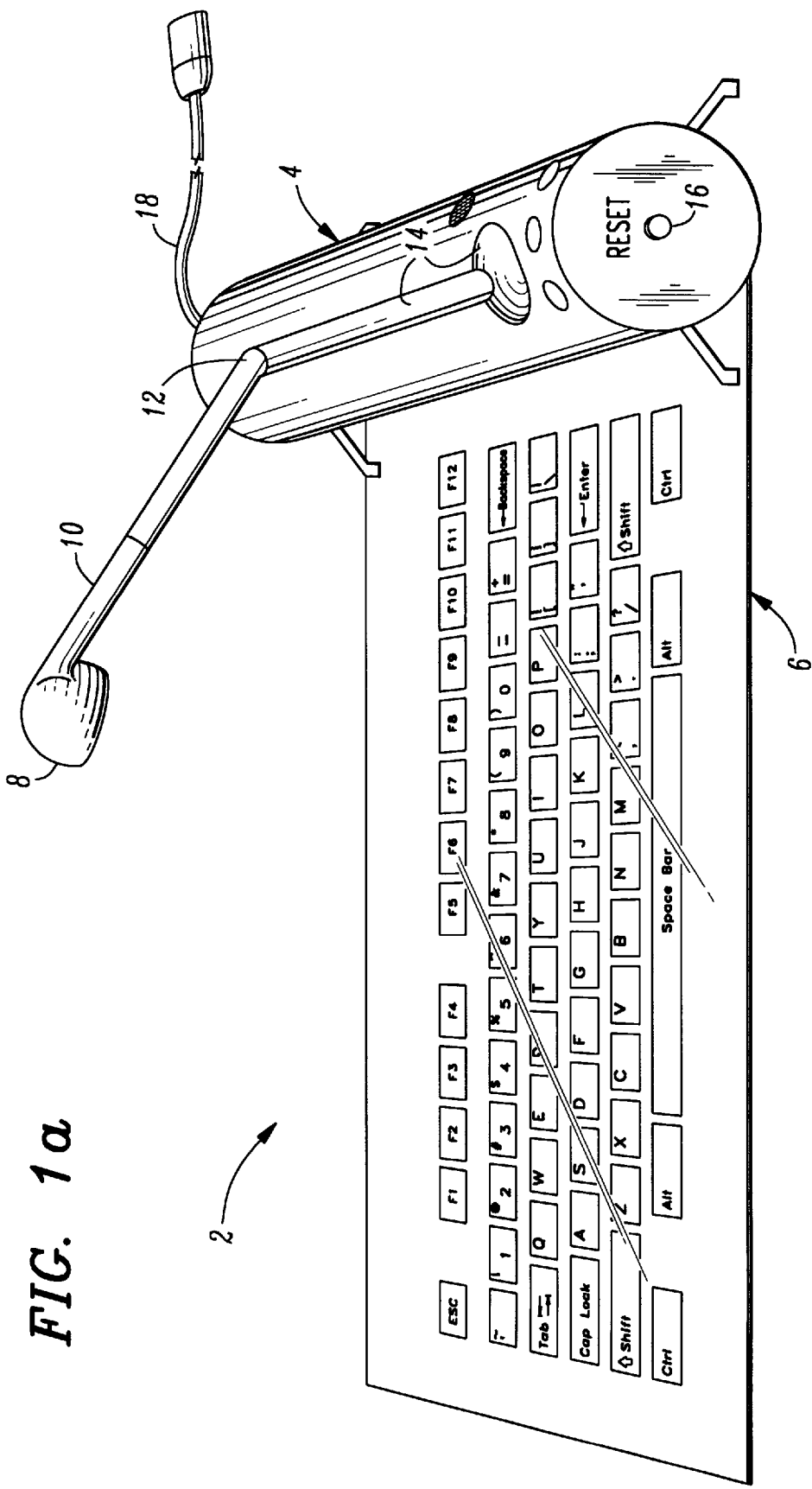
FIG. 1a is a perspective view of a furlable keyboard apparatus constructed in accordance with a preferred embodiment of the invention, with the keyboard apparatus in an unfurled state ready for use.
Figure 1B:
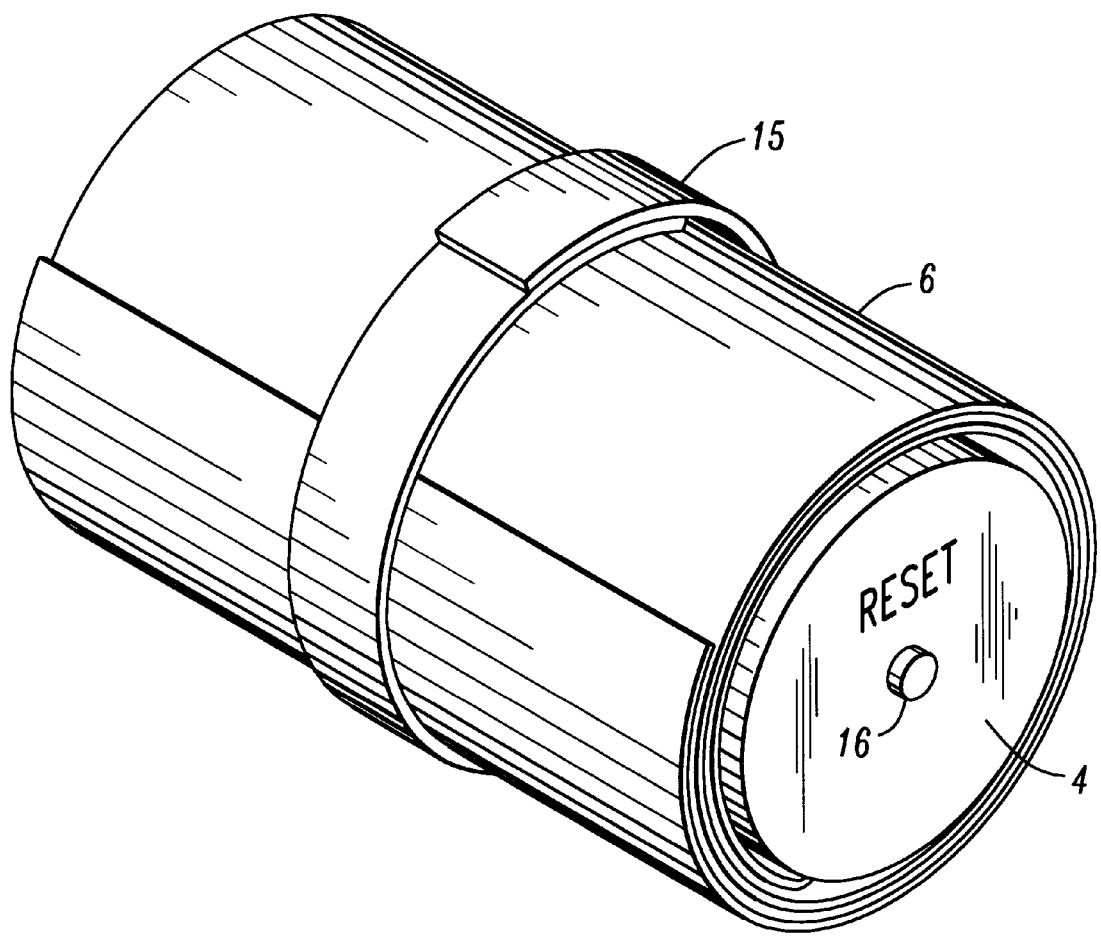
FIG. 1b is a perspective view of the furlable keyboard apparatus of FIG. 1a, with the keyboard apparatus in a furled or stowed position.
Figure 2:
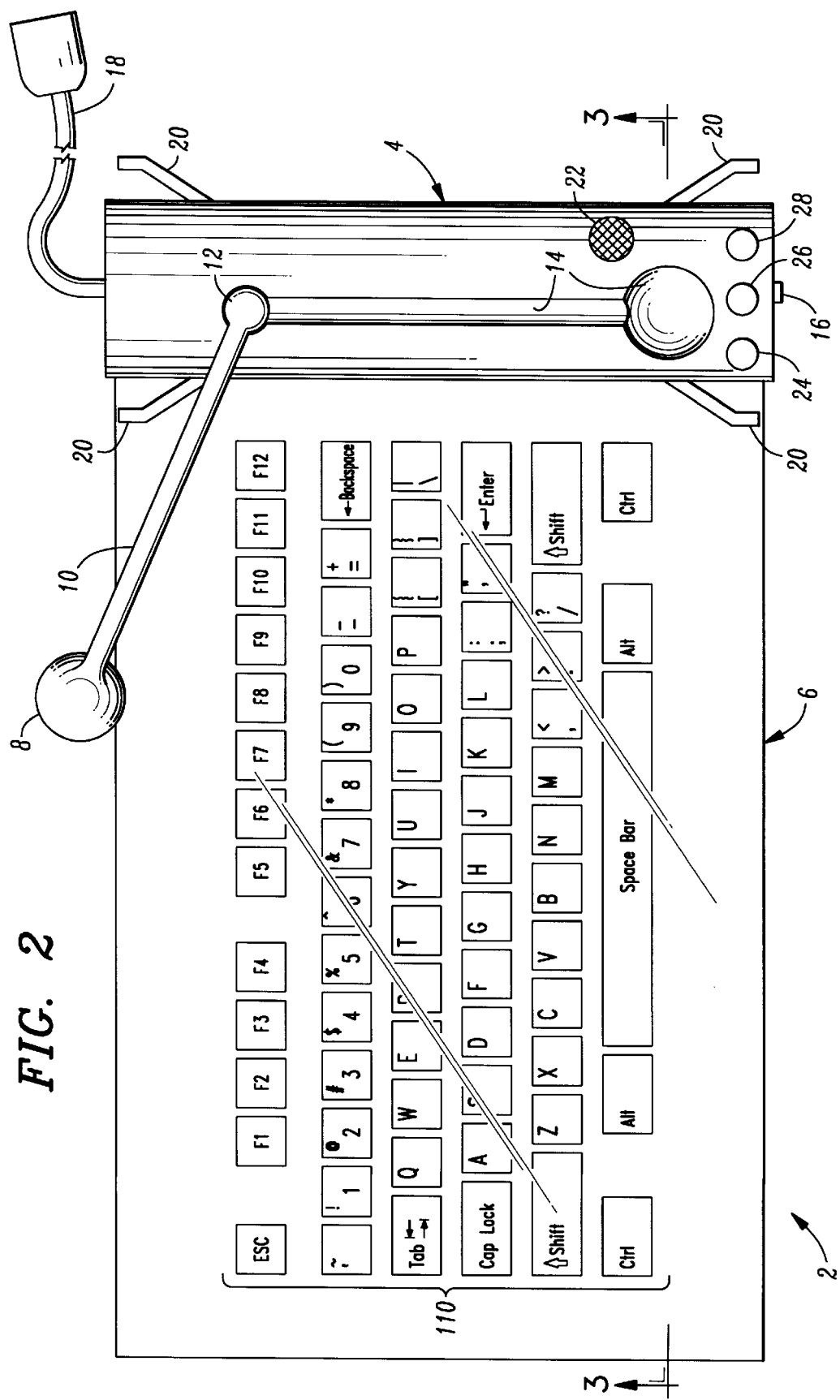
FIG. 2 is a plan view of the furlable keyboard of FIG. 1.

Turning now to the Drawing, wherein like reference numbers designate like elements in all of the views, FIGS. 1a, 1b and 2 illustrate a furlable keyboard apparatus 2 constructed in accordance with a preferred embodiment of the invention. The keyboard apparatus 2 includes a generally cylindrical housing 4, made from rigid plastic or the like, that mounts a flexible keyboard 6 such that the keyboard is furlable around the housing 4 when the keyboard apparatus 2 is not in use. A solid state camera 8 is mounted on a stalk 10 that is pivotally secured to the housing at 12, such that the camera is adjustably positionable over the flexible keyboard 6. When the keyboard apparatus 2 is not in use, the camera 8 and camera mounting stalk 10 are received in an elongated recess 14 formed in the housing 4. The recess 14 is shaped to receive the camera 8 and its mounting stalk 10 so that these components can be positioned below the cylindrical surface of the housing 4. As shown in FIG. 1a, the keyboard apparatus 2 can be furled into a compact cylindrical shape for easy transport. A retaining strap 15 is provided to secure the keyboard apparatus in its folded position.

A reset button 16 is mounted on one end of the housing 4 and, as explained in more detail below, allows a user to manually reset the keyboard electronics. At the other end of the housing 4, a conventional plug-in interface cable 18 is provided for connecting the keyboard apparatus 2 to a host, such as a personal computer, PDA, wireless terminal or any other device capable of receiving keyboard input. As is known in the art, the interface cable 18 transfers power from the host to the keyboard apparatus 6, and provides keystroke output signals from the keyboard apparatus 6 to the host.

The flexible keyboard 6 can be made to be any desirable size. To provide the look and feel of a full-size standard keyboard, however, the keyboard 6 should be about four inches high by twelve inches wide, when viewed in plan, as shown in FIG. 2. To ensure proper furling, the housing 4 should be at least as long as the keyboard is high, i.e., about four inches, and is preferably about five inches long. Its diameter can vary but is preferably at least one inch in order to accommodate the keyboard electronics disposed within the housing interior.

In order to stabilize the keyboard apparatus 2 during use, the housing 4 is provided with four legs 20. The legs 20 can be attached to the housing 4 in any suitable fashion that allows the legs 20 to be stowed when the keyboard apparatus 2 is not in use. For example, the legs 20 can be pivotally mounted to the housing 4 and the housing 4 may be formed with elongated recesses (not shown) for stowing the legs below the housing's cylindrical surface.

The housing 4 also mounts a miniature speaker 22 and, optionally, three control buttons 24, 26 and 28 for providing mouse functionality, as described in more detail below.

Figure 3:
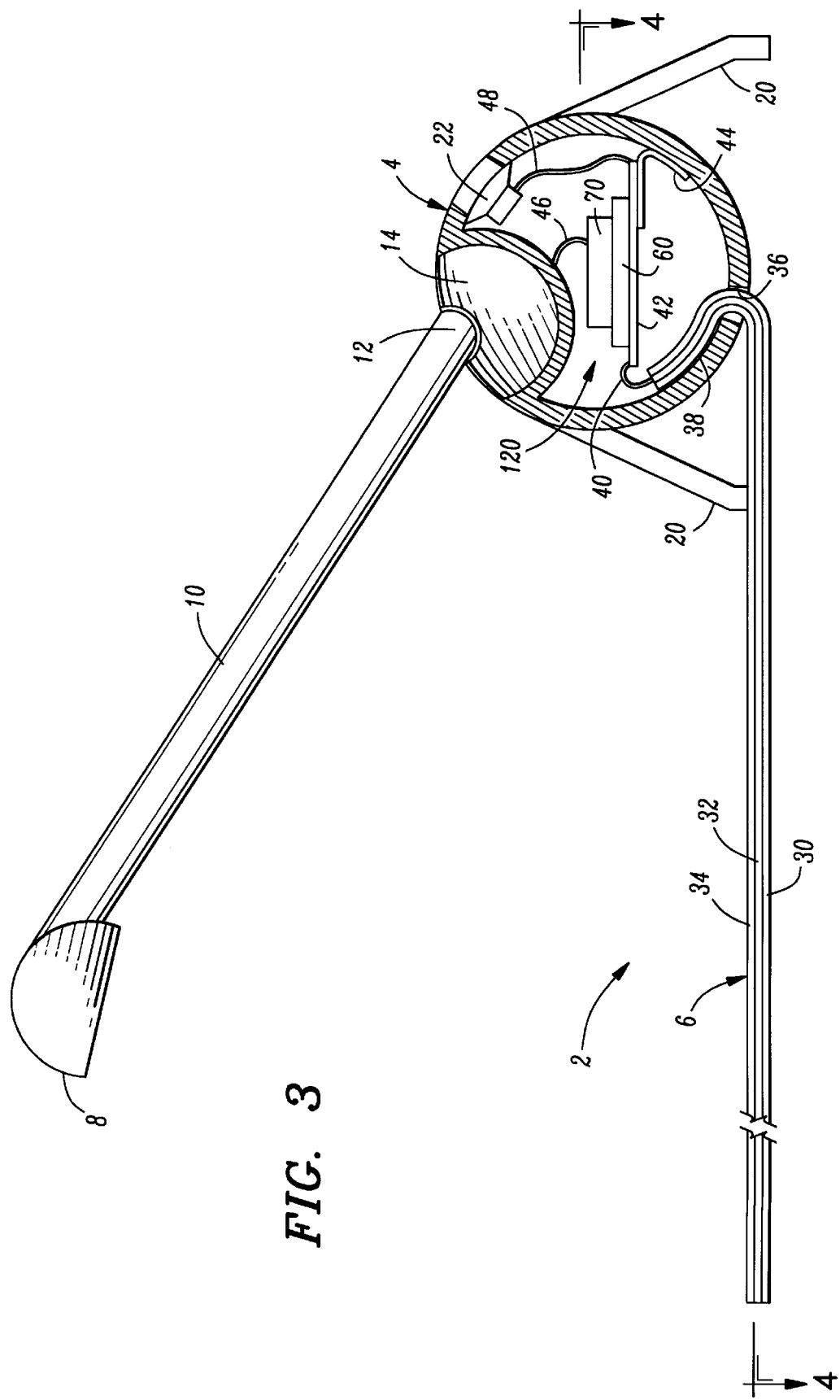
FIG. 3 is a cross-sectional view of the furlable keyboard of FIG. 1 taken substantially along line 3—3 in FIG. 2.

Turning now to FIG. 3, the flexible keyboard 6 is shown as having three plies or layers. A first flexible base layer 30, which can be made from neoprene rubber or the like, is provided for supporting the flexible keyboard 6 on a work surface (not shown). A flexible intermediate circuit board layer 32 is mounted on the base layer 30. The circuit board layer 32 can be made from any suitable flexible material capable of supporting a plurality of electrical components and interconnecting electrical paths. One such material is an insulative sheet product sold by Dupont Corporation under the name KAPTON™. This flexible material is used, by way of example, on the outside of ink-jet printing cartridges to provide electrical connections between the ink discharge ports of the cartridge and a host printer. A flexible protective upper layer 34 is mounted on the intermediate circuit board layer 32. This layer can be made from any suitable plastic material.

Figure 4:
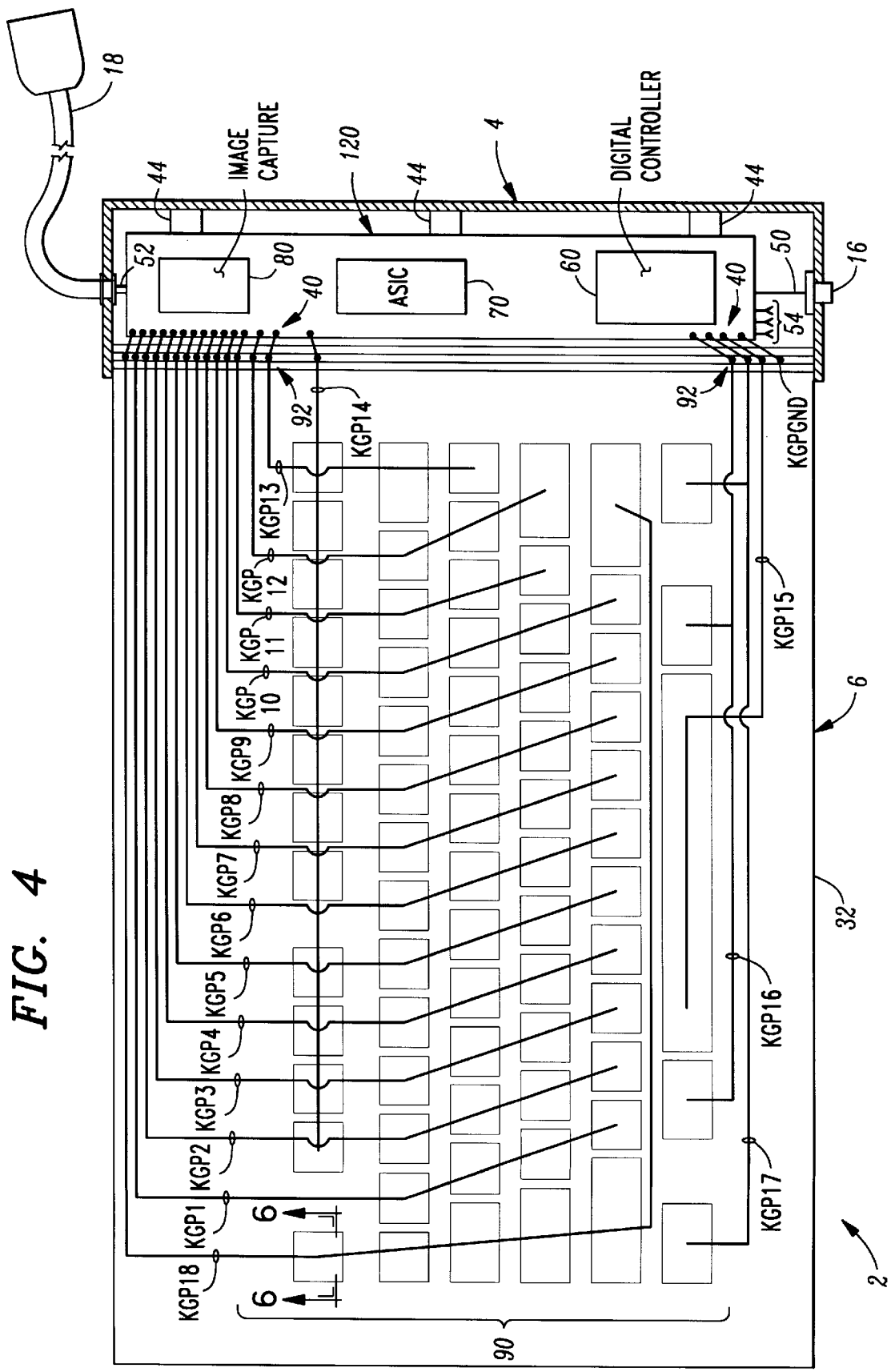
FIG. 4 is a cross-sectional view of the furlable keyboard of FIG. 1 taken substantially along line 4—4 in FIG. 3.

The flexible keyboard 6 extends through a slot 36 in the housing 4 and is mounted to the inside wall of the housing at 38. This mounting may be achieved by adhesive means, fasteners or any other suitable technique that adequately secures the flexible keyboard 6 to the housing 4. Electrical connections 40 extend from the end of the flexible keyboard 6 that is located within the housing 4 to a circuit board 42. The circuit board 42 is secured to the inside wall of the housing 6 by one or more attachment clips 44. The camera 8 is also connected to the circuit board 42 via electrical connections 46. The speaker 22 is connected to the circuit board 42 via electrical connections 48. As shown in FIG. 4, additional connections to the circuit board 42 include a connector 50 from the reset button 16, connectors 52 from the keyboard interface cable 18, and connectors 54 from the mouse mode control buttons 24, 26 and 28. Also mounted on the circuit board 42, as described in more detail below, are a digital controller 60, an interface device 70 and an image capture circuit 80.

Still referring to FIG. 4, a plurality of small piezoelectric keystroke signal generators 90 are mounted on the intermediate layer 32 of the flexible keyboard 6 in a pattern of generally horizontal key rows and partially diagonal key columns in accordance with standard QWERTY keyboard design. The keystroke signal generators 90 are responsive to finger pressure and pre-assigned groups of these signal generators are interconnected by logical OR wiring, as described with reference to FIG. 5 below, to provide electrical key group ("KGP") signals whenever a keystroke signal generator in one of a group of keys (usually a key column) is pressed or released. FIG. 4 illustrates eighteen key group connections identified as KGP 1 through KGP 18. An exemplary set of key assignments for the key group connections KGP 1 through KGP 18 is as follows:

| KEY GROUP | KEYS |
| --- | --- |
| KGP 1 | 1 Q A Z |
| KGP 2 | 2 W S X |
| KGP 3 | 3 E D C |
| KGP 4 | 4 R F V |
| KGP 5 | 5 T G B |
| KGP 6 | 6 Y H N |
| KGP 7 | 7 U J M |
| KGP 8 | 8 I K , |
| KGP 9 | 9 O L . |
| KGP 10 | 0 P ; / |
| KGP 11 | - [ ' |
| KGP 12 | = ] ENTER |
| KGP 13 | BACKSPACE |
| KGP 14 | F1 THROUGH F12 |
| KGP 15 | SPACE |

-continued

| KEY GROUP | KEYS |
| --- | --- |
| KGP 16 | ALT |
| KGP 17 | CTRL |
| KGP 18 | ESC TAB CAPS LOCK SHIFT |

In addition to the eighteen key group connectors KGP 1 through KGP 18, there is a common ground connection, KGPGND, connecting all of the keystroke signal generators, as described below with reference to FIGS. 5, 6a, 6b and 6c. All of the key group connectors KGP 1 through KGP 18, and the common ground connection KGPGND, terminate at pins 92 located at the end of the flexible keyboard 6 that is situated within the housing 4. The pins 92 are individually attached to respective ones of the connectors 40 that extend to the circuit board 42.

Figure 5:
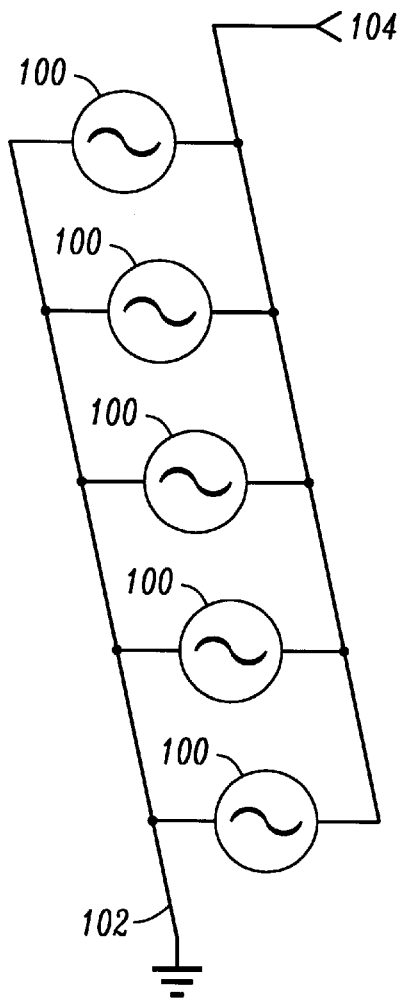
FIG. 5 is a schematic representation illustrating wire-ORed electrical connections between plural keystroke generators in a single key group in accordance with the invention.

Referring now to FIG. 5, a group of piezoelectric keystroke signal generators 100 is illustrated schematically in a wire-ORed configuration. Each keystroke signal generator 100 acts as a current generator that produces a voltage spike when the signal generator is deformed by physical strain, as is well known in the electronics art. If one side of each signal generator 100 is connected to a common ground 102, and other side of each signal generator 100 is connected to a common output 104, then the activation of any one of the signal generators will produce a voltage spike at the output 104. Thus, if the keystroke signal generators 100 are part of a key group containing, for example, the keys 3-E-D-C or 7-U-J-M, or any other group, a key group voltage spike signal will be generated if any keystroke signal generator in the group is pressed. There is nothing in the key group signal to indicate which keystroke signal generator is pressed. However, the sense of the signal is known by virtue of the output polarity. If a keystroke signal generator is pressed, the key group voltage spike will have a predetermined sense. When the keystroke signal generator is released, another key group voltage spike will be generated having an opposite sense. The former signal is sometimes referred to hereafter as a "key press" while the latter signal is sometimes referred to hereafter as a "key release."

Figure 6A:
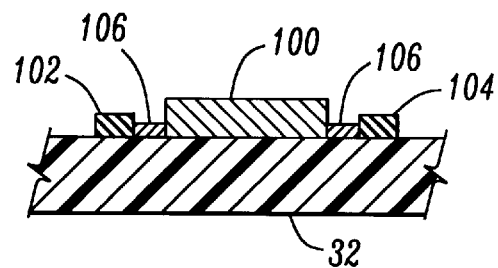
FIG. 6a is a cross-sectional view taken substantially along line 6—6 in FIG. 4 showing one alternative configuration for wiring a keystroke generator in accordance with the invention.
Figure 6B:
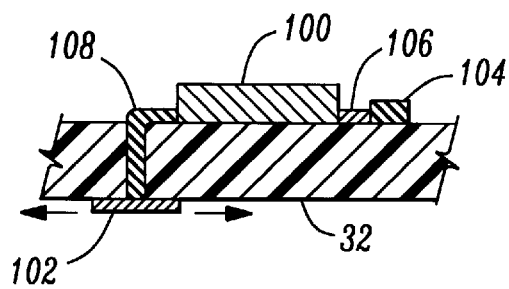
FIG. 6b is a cross-sectional view taken substantially along line 6—6 in FIG. 4 showing another alternative configuration for wiring a keystroke generator in accordance with the invention.
Figure 6C:
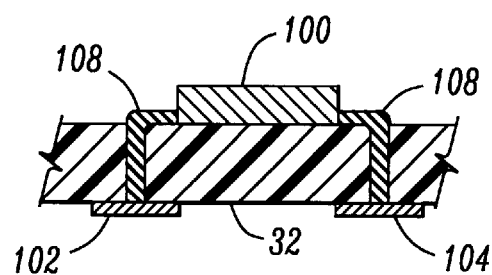
FIG. 6c is a cross-sectional view taken substantially along line 6—6 in FIG. 4 showing yet another alternative configuration for wiring a keystroke generator in accordance with the invention.

FIGS. 6a, 6b and 6c illustrate three exemplary configurations which may be alternatively utilized for mounting the keystroke signal generators 100 and the common ground and output connections 102 and 104, respectively, on the intermediate layer 32 of the flexible keyboard 6. In FIG. 6a, the keystroke signal generator 100, the common ground connection 102 and the output connection 104 are located on the upper surface of the intermediate layer 32. These connections are joined by signal paths 106 which are also formed on the upper surface of the intermediate layer 32.

In FIG. 6b, the keystroke signal generator 100 and the output connection 104 are located on the upper surface of the intermediate layer 32. These connections are joined by a signal path 106 which is also located on the upper surface of the intermediate layer 32. The common ground connection 102 is formed on the lower surface of the intermediate layer 32 and, as shown in FIG. 6b, may be formed as a sheet that extends under all of the keystroke signal generators 100 in a key group, or under all of the key groups situated on the intermediate layer 32. A signal path 108 extends from the keystroke signal generator 100, along the upper surface of the intermediate layer 32, then through the intermediate layer to the lower surface thereof In FIG. 6c, the keystroke signal generator 100 is located on the upper surface of the intermediate layer 32. The common ground connection 102 and the output connection 104 are located on the lower surface of the intermediate layer 32. A pair of signal paths 108 extend from each side of the keystroke signal generator 100, along the upper surface of the intermediate layer 32, then through the intermediate layer 32 to the lower surface thereof where they connect to the common ground and output connections 102 and 104, respectively.

Returning now to FIGS. 2 and 4, a plurality of key representations 110 are formed on the flexible keyboard 6 above each of the keystroke signal generators 90 and in one-to-one correspondence therewith. The key representations 110 may be formed on the upper flexible keyboard layer 34, or directly on the keystroke signal generators 90, as desired. In the former configuration, the upper keyboard layer 34 can be opaque, with the key representations being applied thereto by stenciling or any other suitable image forming technique. In the latter configuration, the upper flexible keyboard layer 34 is transparent or translucent so that the key representations applied on the keystroke signal generators 90 are visible therethrough.

Figure 7:
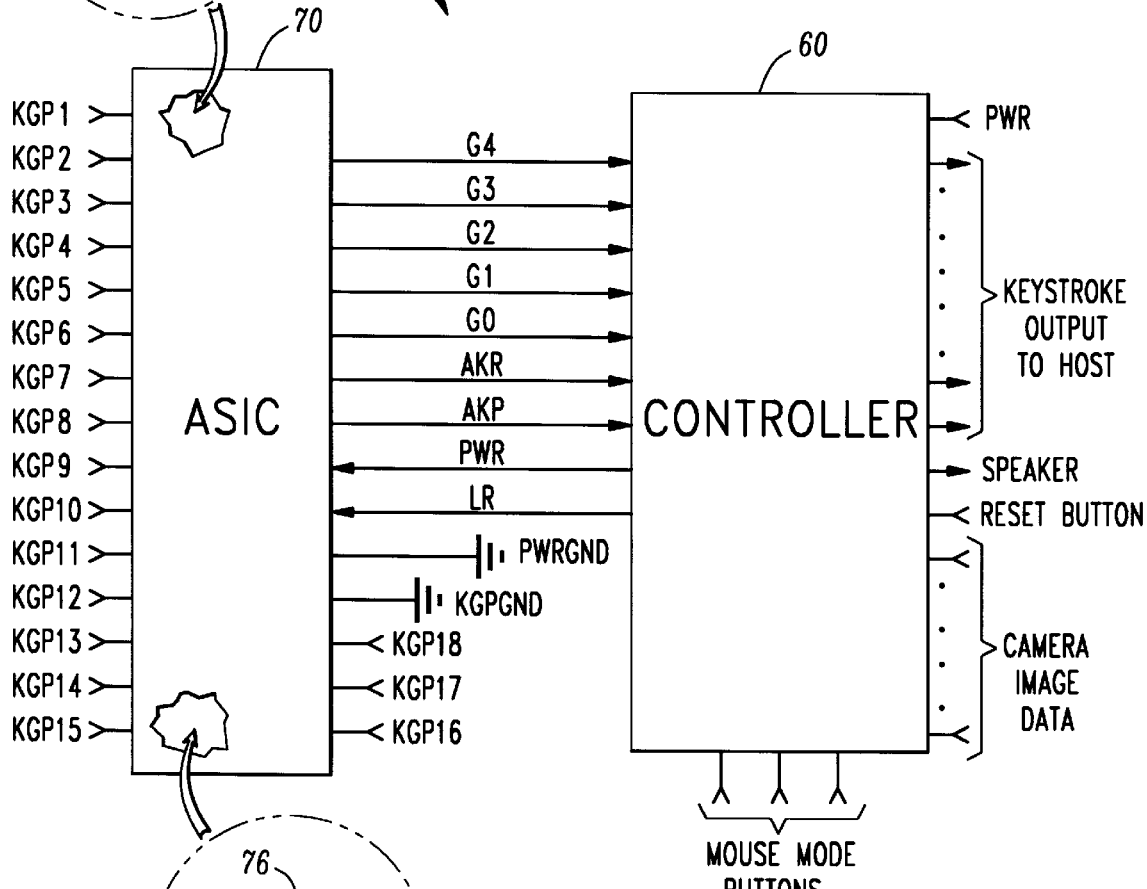
FIG. 7 is a diagrammatic representation showing pin connections between the components of a keystroke recognizer in accordance with a preferred aspect of the invention.

Turning now to FIG. 7, the digital controller 60 and the ASIC device 70 provide a keystroke recognizer 120 that is mounted within the housing 4 and which outputs keystroke information to a host device whenever a user presses or releases one of the key representations 110.

The interface device 70 is preferably formed from a low cost Application Specific Integrated Circuit (ASIC) that is packaged, for example, in a DIP (Dual In-Line) pin configuration. Such devices, which in the keyboard apparatus of the present invention would require no more than 29 pins, are relatively low in cost and readily available. The ASIC device 70 has eighteen key group electrical input pins, labeled KGP 1 through KGP 18, receiving corresponding key group signals KGP 1 through KGP 18 from the keystroke signal generators 90 on the flexible keyboard 6. Another electrical input pin, labeled KGPGND, is connected to the key group ground (KGPGND). There is also a power input pin PWR, a power ground pin PWRGND, and a logic reset pin LR. If desired, the power ground pin PWRGND may be common with KGPGND. The ASIC device 70 has seven logic output pins that are connected to the controller 60. Five of the logic output pins, labeled G0 through G4, are capable of providing a binary output spanning a numeric range of 0 to 32. The two remaining logic output pins are an "Any-Key-Press" output AKP and an "Any-Key-Release" output AKR. Summarizing, the ASIC device 70 pinouts are as follows:

18 KGP signal inputs
1 KGP ground
7 logic outputs
1 logic input
1 power supply ground (possibly common with KGP ground)

In operation, the ASIC device 70 receives electrical inputs in the form of voltage spikes from the key groups as key representations are pressed by a user. Within the ASIC device 70, associated with each electrical input connection KGP 1 through KGP 18, there is provided either a pair of diodes 72 and 74, shown in FIG. 7', or an edge detector 76, as shown in FIG. 7". These components allow the ASIC device 70 to separately identify positive and negative key group input signals and thereby distinguish key presses from key releases.

When a key press signal is received, the ASIC device 70, through an arrangement of sequential and combinatorial logic components of conventional design, produces a binary word output at pins G0 through G3 that corresponds to a key representation in KGP I through KGP 15 being pressed. The G4 pin is reserved for KGP 16 through KGP 18, which contain certain special character keys, such as the Shift and Caps Lock keys. Thus, if a key representation in KGP 1 is pressed, such as a lowercase "Q," the binary word at output pins G0 through G3, together with the output at pin G4, assuming G0 is the least significant digit, would be 00001, as follows:

G0=1
G1=0
G2=0
G3=0

If a special character key representation in KGP 16, KGP 17 or KGP 18 is pressed, the G4 pin is set high and the pins G0 through G3 are not affected. These pins are left available to allow for the simultaneous activation of a non-special character key. This allows, for example, a user to type uppercase characters by activating the Shift or Caps Lock keys, which are in KGP 18, in combination with any of the letter or number keys, which are in KGP 1 through KGP 13. Thus, if the either Shift or Caps Lock key is pressed in KGP 18, and the "Q" key is pressed in KGP 1, the binary word output at pins G0 through G3, together with the output at pin G4, assuming G0 is the least significant digit, would be 10001, as follows:

G0=1
G1=0
G2=0
G3=0
G4=1

In addition to producing a binary output at pins G0 through G4, the ASIC device 70 produces a binary 1 value at the "Any-Key-Press" output pin AKP whenever any key representation is pressed by the user. When a key representation is released by the user, the ASIC device 70 produces a binary 1 value at the "Any-Key-Release" output pin AKR.

Figure 8:
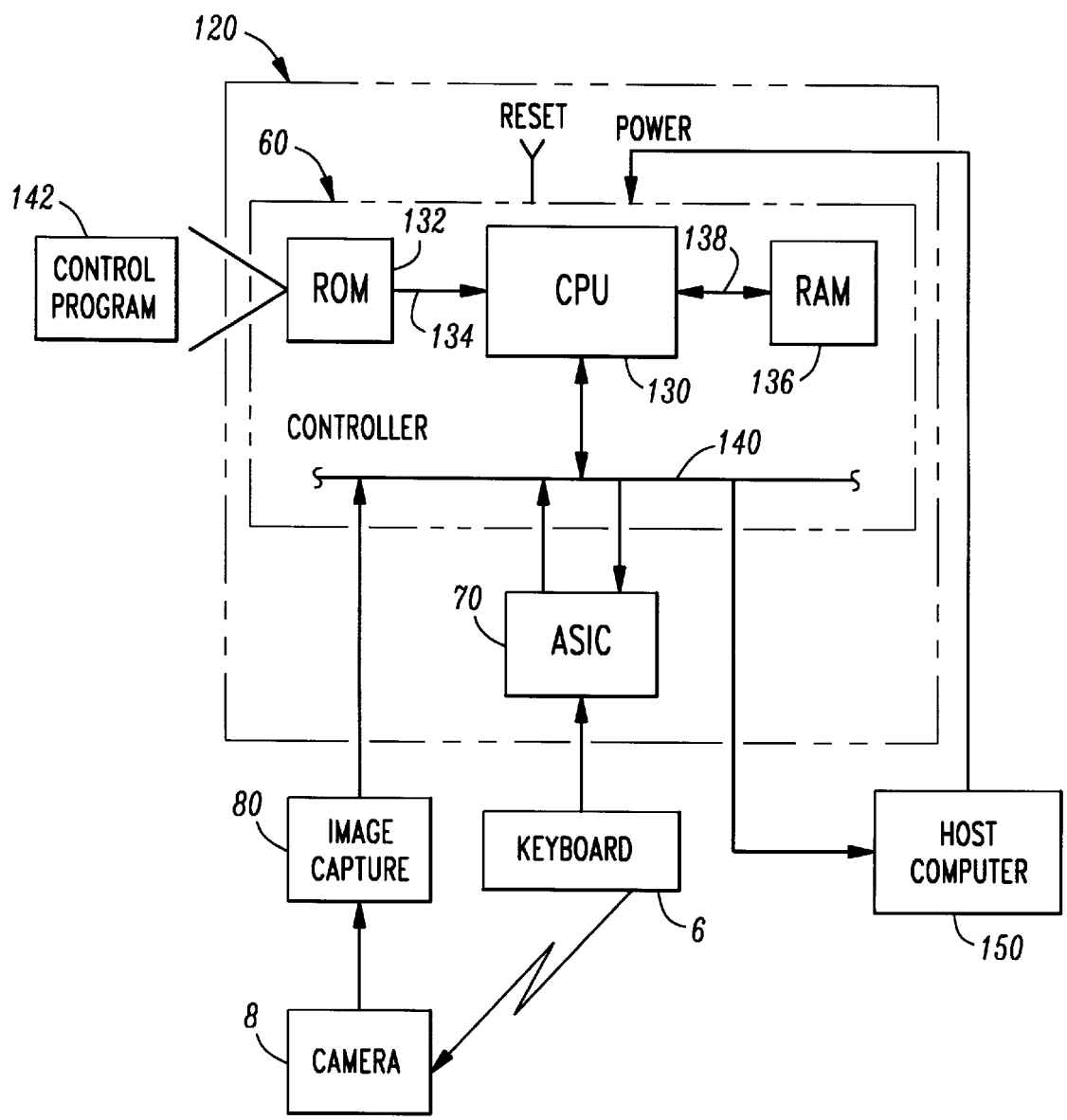
FIG. 8 is a block diagram showing the functional components of the furlable keyboard of FIG. 1.

Turning now to FIGS. 7 and 8, the controller 60 is preferably a small microprocessor-based programmable computer having a central processing unit (CPU) 130, a ROM memory 132 connected to the CPU through a bus 134, a RAM memory 136 connected to the CPU through a bus 138, and an external bus 140. A control program 142 is stored in the ROM memory 132 as firmware and executes in the CPU 130 during keyboard operations to control the keyboard functions described herein. The RAM memory 136 is used during keyboard operations to store data generated by the control program 142 and keyboard image data received from the camera 8 via the image capture circuit 80.

A shown in FIG. 7, the controller 60 receives logic inputs from the output pins G0 through G4, AKP and AKR of the ASIC device 70. The controller also receives camera image data from the image capture circuit 80 and electrical input from the reset button 16. Power is provided from the interface cable 18. On the output side, the controller 60 is connected to strobe the logic reset pin LR on the ASIC 70. The controller 60 also places digital keystroke output signals on the interface cable 18, provides an analog signal to the speaker 22, and provides power to the ASIC 70.

As shown in FIG. 8, the ASIC device 70 and the image capture board 80 preferably communicate with the controller 60 by sharing the bus 140. Other arrangements, such as providing dedicated inputs from these devices, could also be implemented. Similarly, the bus 140 may be used to output the keystroke signals to the interface cable 18, which in FIG. 8, connects to a host computer 150.

The furlable keyboard apparatus 2 is placed in its operational position by unfurling the flexible keyboard 6 from around the housing 4 and placing the keyboard and housing on a flat surface. The retractable legs 20 are extended into their use position to prevent the housing 6 from rolling during keyboard operation. The camera stalk 10 is extended so that the camera 8 is positioned over the center of the flexible keyboard 6. The interface cable 18 may then be plugged into a host computer, and this causes the keystroke recognizer 120 to begin receiving power.

Figure 9A:
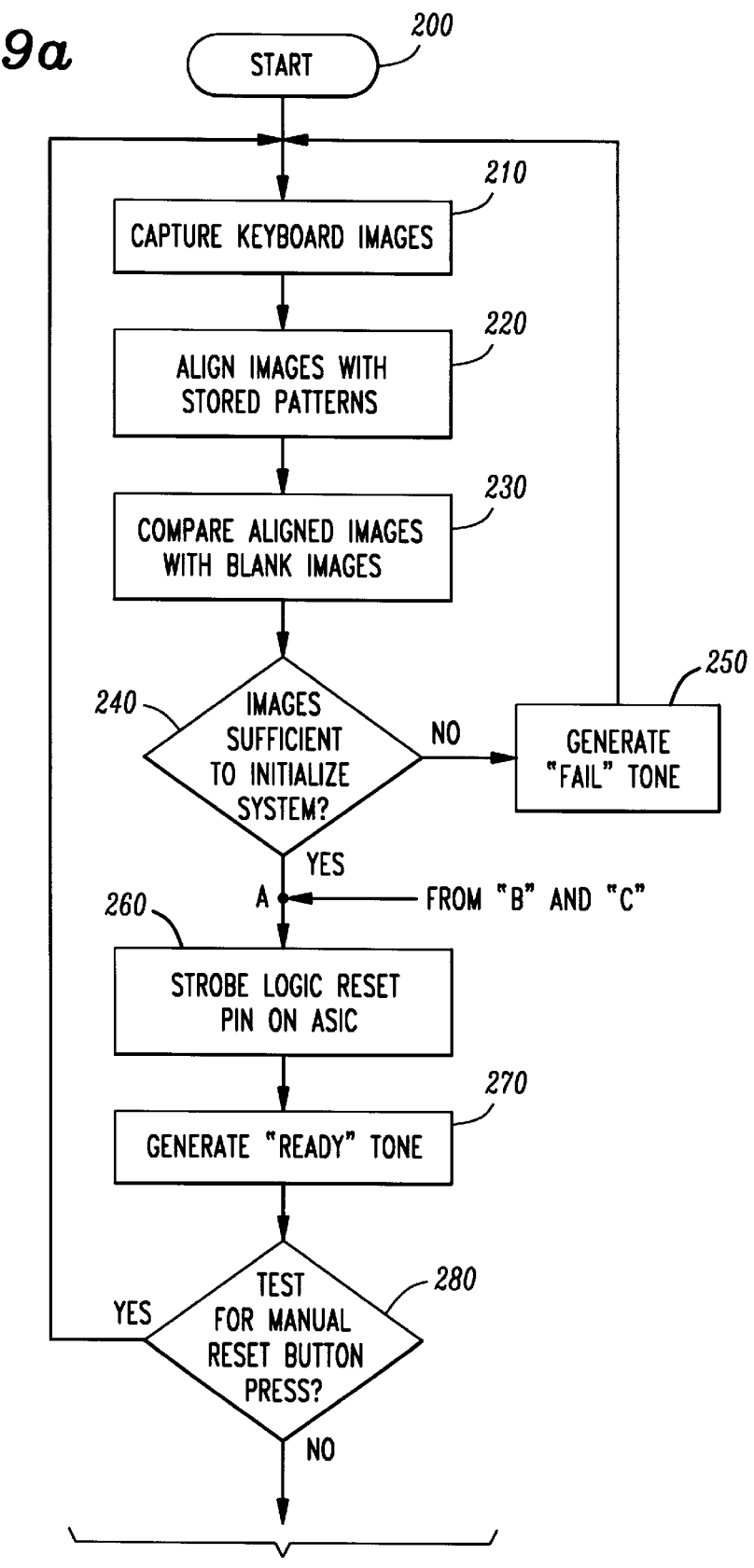
FIG. 9a is a first portion of a flow diagram illustrating functional method steps performed by the furlable keyboard of FIG. 1.

Referring now to FIG. 9a, a sequence of method steps performed by the furlable keyboard apparatus 6 in accordance with the present invention will be described. Beginning in step 200, when the keystroke recognizer 120 begins receiving power, or when the manual reset button 16 is pressed, the recognizer 120 proceeds to step 210 and captures several images of the keyboard typing surface. The user may not have his/her hands on the flexible keyboard 6 at this time. The blank keyboard images that are obtained by the camera 8 are fed to the image capture circuit 80, where they are converted to digital form and then stored in the RAM memory 136 of the controller 60. The recognizer 120 uses these blank images to initialize the recognition software. To that end, the ROM memory 132 in the controller 60 stores a pattern representative of the image of a blank keyboard without a user's hands thereon. In step 220 of FIG. 9a, the captured blank keyboard images are aligned with the stored pattern (e.g., using conventional image normalization techniques) and in step 230, the captured blank images are compared with the stored pattern. If in step 240 the image comparison result fails to satisfy a predetermined similarity threshold, a fail tone is generated on the speaker 22 in step 250, and the procedure returns to step 210 to reattempt image acquisition. If in step 240, the image comparison result meets or exceeds the established threshold, the controller 60 strobes the logic reset pin LR on the ASIC 70 in step 260 to reset all of the ASIC's logic output pins to low. In step 270, an audible "ready" tone is produced to signify that initialization has been successfully completed. The user may begin typing after the "ready" tone is heard.

Figure 9B:
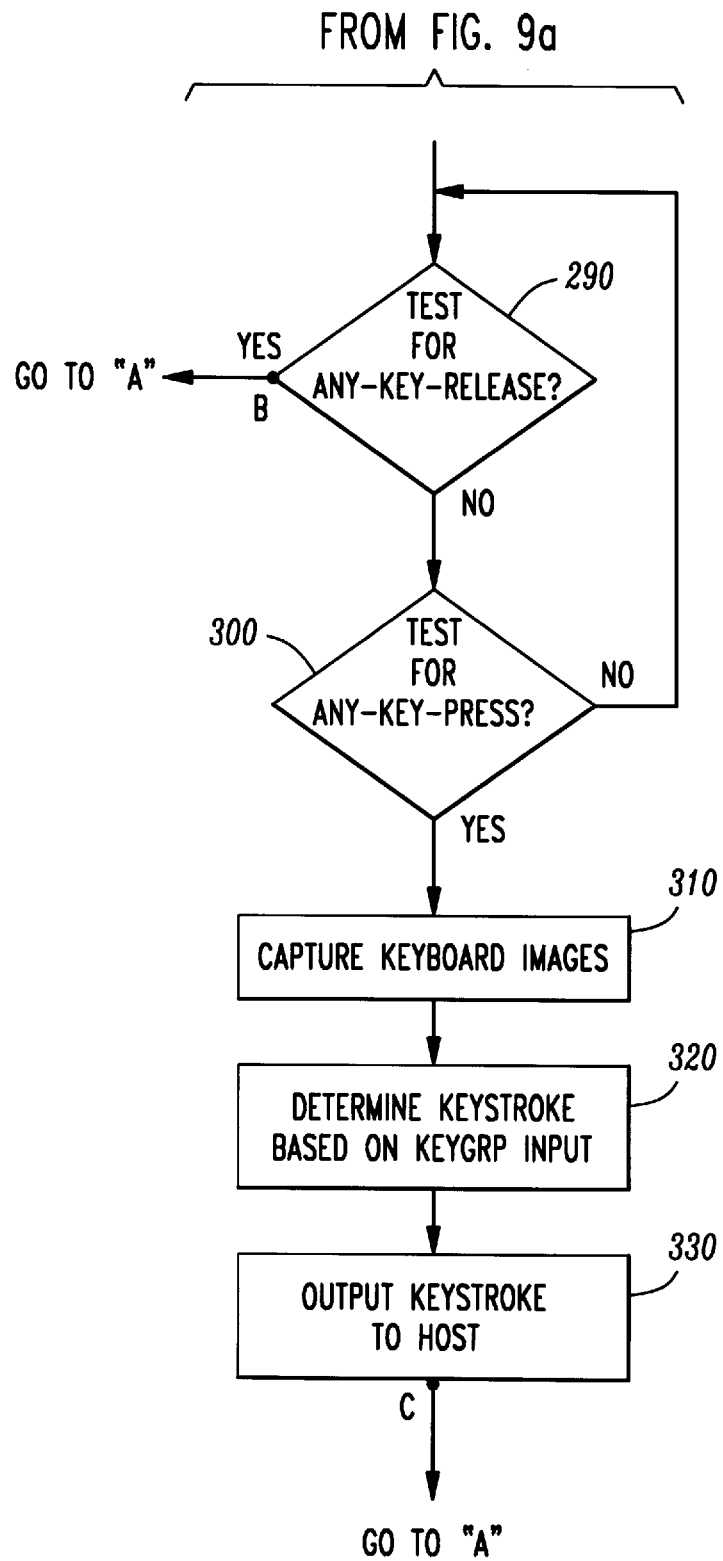
FIG. 9b is a second portion of a flow diagram illustrating functional method steps performed by the furlable keyboard of FIG. 1.

Before the recognizer 120 can process key presses, the controller 60 must test for two conditions that require responsive action. First, in step 280, the controller 60 tests to determine whether the manual reset button 16 has been pushed. If it has, the system returns to step 210 for reinitialization. If the manual reset button 16 has not been pushed, the controller 60 tests, in step 290 of FIG. 9b, whether the "Any-Key-Release" pin AKR on the ASIC 70 has gone high. If it has, the system returns to step 260 and the controller 60 strobes the ASIC logic reset pin LR. If in step 290, the AKR pin on the ASIC 70 is found to be low, the system proceeds to step 300 and tests whether the "Any-Key-Press" pin AKP on the ASIC 70 has been set high. If it has not, the system returns to step 290 and loops through step 300 until one of the key representations 110 is pressed by the user.

When the user presses one of the key representations 110, the "Any-Key-Press" pin AKP on the ASIC 70 will go high. To provide a tactile or sensory response similar to that of a standard keyboard having actual movable keys, the speaker 16 is driven by the controller 60 in response to a keystroke to produce a "click" tone. Alternatively, a synthesized voice could be output that recites the character being pressed.

In response to the activation of a key representation, the test in step 300 produces a true result and the controller 60 proceeds to step 310. In step 310, an image is captured from the camera 8, processed by the image capture circuit into digital form, and then normalized using the normalization data developed during initialization. The image is then stored in the RAM memory 136. In step 320 the output from the logic pins G0–G4 of the ASIC 70 is sampled and the controller 60 determines the key group to which the user-activated key representation belongs. This information is used to determine the appropriate key stroke and the identified keystroke is output to the host computer in step 330 using conventional keyboard signaling.

The key group information can be used in conjunction with the keyboard image data to identify the correct keystroke in a variety of ways. In the preferred implementation of the invention, the key group information is used by the controller 60 to access a library of keystroke patterns that are stored in the ROM memory 132. This library consists of a set of patterns, which may be actual bitmap images or some representation thereof (e.g. a list of significant features as used in character recognition algorithms), that uniquely correspond to each keystroke that a user can make on the flexible keyboard 6. Thus, there is a stored keyboard pattern representing a lowercase "T" keyboard stroke, a lowercase "Y" keyboard stroke, and so on. The library pattern to which the captured keyboard image most closely corresponds is deemed to represent the keystroke that is currently being implemented by the user.

The key group information is used to quickly narrow the field of library patterns that are tested to determine the user's keystroke. Rather than compare the captured keyboard image with every pattern in the library, only the library patterns in the identified key group need to be checked. Thus, in the example of a user pressing a lowercase "T" in KGP5, only the library patterns for the keys 5 T G B need to be checked. Of course, it would be possible to eliminate the use of a camera altogether by wiring each keystroke signal generator independently. However, this would preclude the use of a lowcost DIP ASIC device and would require more sophisticated and expensive hardware.

The foregoing keystroke example is for a lower case character, namely a lowercase "T." To identify an uppercase key press, the controller 60 must have first received a binary output from the ASIC 70 in which the most significant bit G4 is set high. As noted above, this bit is reserved for KGP 16, KGP 17 and KGP 18, which includes the Shift and Caps Lock keys. A high G4 bit will prompt the controller 60 to capture a screen image and compare it with special character key patterns stored in the pattern library to determine which of the special character keys that utilize the G4 bit has been pressed. In example given, the controller 60 will determine that either the Shift key or the Caps Lock key has been pressed. The controller 60 will then read the output bits G0 through G3 of ASIC 70 to determine the key group to which the non-special character belongs. In this case, it is the "T" character belonging to KGP 5. The library patterns within this group are then searched. When a match on the "T" character is found, the controller 60 checks the previously identified special character key press and, finding that one of the Shift or Caps Lock keys has been pressed, outputs a capital "T" to the host computer.

If two or more special character keys are simultaneously pressed, such as Ctrl-Esc, Ctrl-Tab or Alt-Tab, the G4 bit will again go high and an image from the camera 8 will be captured. Because the G0 through G3 bits are all low, the controller 60 knows that only a special character key has been pressed, The captured image will then be compared with only the special character key portion of the pattern library and a match will be generated. It will thus be seen that virtually any combination of special character keys and non-special character keys, or any combination of multiple special character keys, can be rapidly identified by the controller 60 in accordance with the present invention.

As an optional enhancement to the furlable keyboard apparatus of the present invention, the keystroke recognizer 120 could be adapted to function as a mouse position recognizer to provide a mouse-mode function. The mouse-mode function would utilze the mouse-mode buttons 24, 26 and 28 that are mounted on the housing 4, as shown in FIG. 2. The button 24 is activated by the index finger of a user's right hand to invoke the mouse mode. The buttons 26 and 28 are used as "left-click" and "right-click" buttons, respectively. The left hand of the user is used as a mouse pointer that is moved under the camera 8.

To invoke the mouse mode, the user presses the mouse mode button 24 with the index finger of the user's right hand (the "click" hand) while moving the left hand hand (the "pointing" hand) within view of the camera. The recognizer 120 tracks the position of the pointing hand by periodically capturing images from the camera 8. These images can be appropriately masked so that only the tip of the user's left index finger, or some portion thereof, is tracked. Signals representing movements of the tracked portion of the user's left index finger are output to the host, in the same manner as a conventional mouse, in order to control the position of an on-screen mouse pointer image. The recognizer 120 also outputs mouse clicks from the mouse click buttons 26 and 28 in order to provide a full range of mouse functions.

Figure 10:
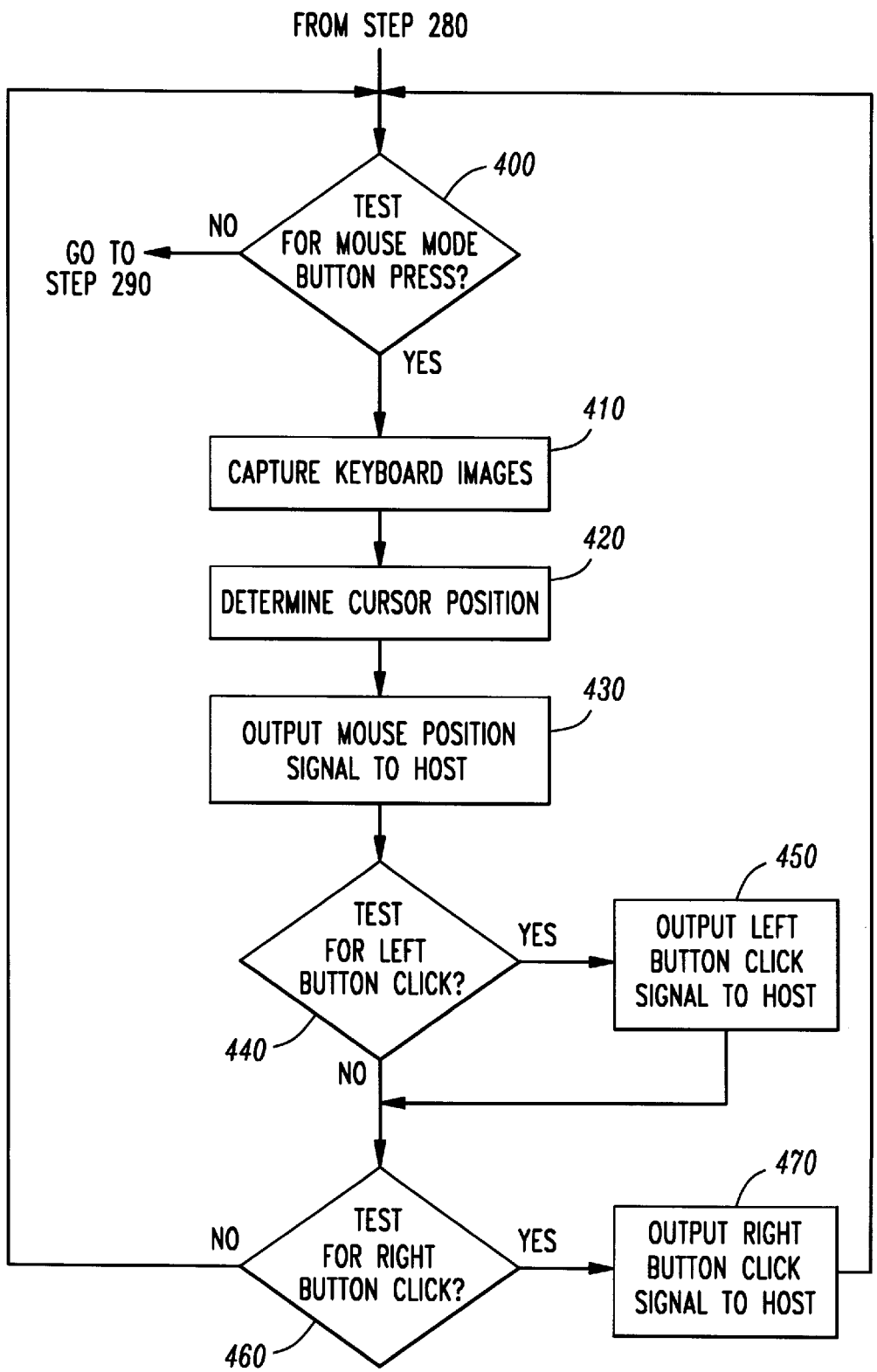
FIG. 10 is a flow diagram illustrating optional functional method steps that can be performed by the furlable keyboard of FIG. 1 if the keyboard is also used as a mouse.

The method steps employed by the recognizer 120 during the mouse mode are shown in FIG. 10. In step 400, the controller, having previously completed step 280, in which it tests for a manual reset button push, tests button the mouse-mode 24 to determine whether it has been pressed. If it has not, the system proceeds to step 290 in FIG. 9b to process normal keyboard input. If the mouse-mode button has been pressed, the controller proceeds in step 410 to capture an image from the camera 8. In step 420, the position of the user's left index finger tip, or some portion thereof, is determined from the captured image and a conventional mouse pointer position signal is output to the host computer in step 430. In step 440, the controller tests for a left mouse button click on the button 26. If the button 26 has been pressed, the controller 60 outputs a conventional left mouse button click to the host computer in step 450. The system then proceeds to step 460. If the button 26 is found not to have been pressed in step 440, the controller 60 tests for a right mouse button click on the button 28 in step 460. If the button 28 has been pressed, the controller outputs a conventional right mouse button click to the host computer in step 470. The system then returns to step 400 to process a new mouse event. If the button 28 is found not to have been pressed in step 460, the system also returns to step 400.

Accordingly, a furlable keyboard apparatus has been described. While various embodiments have been disclosed, it should be apparent that many variations and alternative embodiments would be apparent to those skilled in the art in view of the teachings herein. For example, the recognizer 120 could be implemented in a variety of configurations, and need not necessarily include a software-based controller 60 or an interface 70.

In addition, as shown if FIG. 11, the furlable keyboard apparatus 2 could be modified to provide positive feedback to the user when the Control, Alt, Shift or Shift Lock keys are pressed. This modification requires that four additional pins be added to the ASIC 70, namely, a new KGP19 input pin and three output pins 502, 504 and 506 providing CTRL, ALT and SHIFT/LOCK ouputs to the controller 60, respectively. Three flip-flops 508, 510 and 512 are added to the ASIC 70. These flip-flops are reset during power-up/ initialization of the recognizer 120.

The flip-flop 508 is set when the CTRL key is pressed and reset when the CTRL key is released. The output from the flip-flop 508 is provided to the controller 60 from the output pin 502. When the flip-flop 508 is set, the controller 60 powers an LED 514 mounted on the housing 4 to provide a visual signal to the user that the CTRL state has been set.

The flip-flop 510 is set when the ALT key is pressed and reset when the CTRL key is released. The output from the flip-flop 510 is provided to the controller 60 from the output pin 502. When the flip-flop 510 is set, the controller 60 powers an LED 516 mounted on the housing 4 to provide a visual signal to the user that the ALT state has been set.

The flip-flop 512 is set when the SHIFT key is pressed and reset when the SHIFT key is released. A one-bit counter 518 is provided in the ASIC 70 to receive the KGP 19 input representing the SHIFT-LOCK key. The counter 518 is reset during power up/initialization of the recognizer 120. It acts as a toggle by holding the SHIFT-LOCK state after this key has been pressed and until the SHIFT-LOCK key is pressed a second time. The outputs of the counter 581 and the flip-flop 512 are directed to an Exclusive-OR gate 520, and this gate outputs a SHIFT/LOCK Case value to pin 506. Whenever any alphabetic or numeric key is pressed, the Case value determines whether the key is to be interpreted as upper or lower case. If the Case value is high, the controller 60 activates an LED 522 mounted in the housing 4 to provide a visual signal to the user that the SHIFT state has been set.

What is claimed is:

1. A furlable keyboard apparatus, comprising:

a generally cylindrical housing;

a flexible keyboard mounted to said housing so as to be furlable around said housing when said keyboard apparatus is not in use, said keyboard having keyboard indicia formed thereon providing a plurality of visual key representations arranged in a plurality of generally horizontal key rows and partially diagonal key columns;

a plurality of keystroke signal generators underlying said keyboard indicia and arranged in one-to-one correspondence with said key representations forming said key columns and key rows, said keystroke signal generators being responsive to finger pressure and being interconnected by logical ORing to form key groups providing key group signals whenever a keystroke signal generator underlying one said key groups is pressed or released;

an imaging device mounted on said housing and positionable over said keyboard, said imaging device being adapted to generate an output comprising an imaging signal representing a visual image of said keyboard; and a keystroke recognizer mounted within said housing, said keystroke recognizer including first means for activating said imaging device to generate an imaging signal in response to a key group signal being generated by one of said keystroke signal generators, and second means for generating a keystroke output signal based on said imaging signal and said key group signal, said keystroke output signal being indicative of one of said key representations being pressed by a user of said keyboard apparatus.

2. A furlable keyboard apparatus in accordance with claim 1 wherein said keystroke signal generators are piezoelectric transducers.

3. A furlable keyboard apparatus in accordance with claim 1 wherein said imaging device is a solid state camera.

4. A furlable keyboard apparatus in accordance with claim 1 wherein said keystroke recognizer includes a digital controller mounted within said housing, said digital controller having input connections receiving key group inputs representative of said key group signals and image inputs representative of said keyboard images, and said digital controller further having output connections providing said keystroke signals.

5. A furlable keyboard apparatus in accordance with claim 4 wherein said digital controller is a programmed microprocessor.

6. A furlable keyboard in accordance with claim 4 wherein said keystroke recognizer further includes an interface device mounted within said housing, said interface device having key group input connections receiving said key group signals and key group output connections providing binary key group output values that are indicatative of a key representation in one of said key groups being pressed or released, said key group binary output values being provided by said interface device to said digital controller key group inputs.

7. A furlable keyboard apparatus in accordance with claim 6 wherein said interface device includes diode pairs associated with each key group input connection for separating positive and negative key group signals and distinguishing key representation presses from key representation releases.

8. A furlable keyboard apparatus in accordance with claim 6 wherein said interface device includes edge detectors associated with each key group input connection for identifying positive and negative key group signals and distinguishing key representation presses from key representation releases.

9. A furlable keyboard apparatus in accordance with claim 6 wherein said interface device is an Application Specific Integrated Circuit (ASIC).

10. A furlable keyboard apparatus in accordance with claim 1 further comprises:
 a pair of mouse-click buttons mounted on said keyboard apparatus;
 a mouse position recognizer mounted within said housing, said mouse position recognizer including first means responsive to said imaging signals for generating a mouse position signal, and second means responsive to activation of said mouse-click buttons for generatating a mouse-click signal.

11. A furlable keyboard apparatus in accordance with claim 1 wherein said flexible keyboard includes a flexible base layer supporting said keyboard on a surface, an intermediate layer formed from a flexible circuit board and mounting said keystroke signal generators and the interconnections therebetween, and a flexible upper layer.

12. A furlable keyboard apparatus in accordance with claim 11 wherein said keyboard indicia are formed on said upper layer.

13. A furlable keyboard apparatus in accordance with claim 11 wherein said keyboard indicia are formed on said keystroke signal generators and said upper layer is substantially transparent to allow said keyboard indicia to be viewed therethrough.

14. A furlable keyboard apparatus in accordance with claim 1 further including retractable legs mounted on said housing for preventing said housing from rolling during use of said flexible keyboard.

15. A furlable keyboard apparatus in accordance with claim 1 further including means for generating sounds in response to a user pressing one of said key representations.

16. A furlable keyboard apparatus in accordance with claim 15 wherein said sound is a click.

17. A furlable keyboard apparatus in accordance with claim 15 wherein said sound is a voice response identifying the key representation that was pressed.

18. A furlable keyboard apparatus in accordance with claim 1 wherein said housing is a cylindrical plastic case that measures no more than about 1 inch in diameter by five inches in length.

19. In a keyboard input device, a method for identifying keystrokes made by a keyboard user, comprising the steps of:
 capturing a keyboard image with an imaging device in response to the user pressing a keyboard key;
 identifying a key group to which the pressed keyboard key belongs;
 using the identified key group as a filter, comparing the captured keyboard image against a pre-stored library of keyboard patterns corresponding to each possible keystroke that can be made on the keyboard, said key group filter being used to exclude library patterns that are not within the identified key group; and
 upon a match occuring between said captured keyboard image and one of filtered key group library patterns, outputting a keystroke signal to the host device.

20. A furlable keyboard apparatus, comprising:
 a generally cylindrical housing;
 a flexible keyboard mounted to said housing so as to be furlable around said housing when said keyboard apparatus is not in use, said flexible keyboard including a flexible base layer supporting said keyboard on a surface, an intermediate layer formed from a flexible circuit board, and a flexible upper layer;
 a plurality of peizoelectric keystroke signal generators mounted on said intermediate layer in a pattern of generally horizontal key rows and partially diagonal key columns, said keystroke signal generators being responsive to finger pressure and being interconnected by logical ORing to define key groups providing key group signals whenever a keystroke signal generator in one of said key groups is pressed or released;
 a plurality of key image representations formed on said flexible keyboard over each of said keystroke signal generators, in one-to-one correspondence therewith, said key image representations being formed either on said upper flexible keyboard layer, or directly on said keystroke signal generators;
 a solid state camera imaging device mounted on said housing and positionable over said keyboard, said imaging device being adapted to generate an output comprising an imaging signal representing a visual image of said keyboard; and
 a keystroke recognizer mounted within said housing, said keystroke recognizer including a digital controller having input connections receiving key group inputs representative of said key group signals and image inputs representative of said keyboard images, and said digital controller further having output connections providing said keystroke signals;
 first means in said digital controller for activating said imaging device to generate an imaging signal in response to a key group signal being generated by one of said keystroke signal generators, and second means in said digital controller for generating a keystroke signal based on said imaging signal and said key group signal, said keystroke signal being indicative of one of said key representations being pressed by a user of said keyboard apparatus;

said keystroke recognizer further including an interface device formed from an Application Specific Integrated Circuit (ASIC), said interface device having key group input connections receiving said key group signals and key group output connections providing binary key group output values that are indicatative of a key representation in one of said key groups being pressed or released, said key group binary output values being provided by said ASIC to said digital controller key group inputs;

said interface device including either diode pairs or edge detectors associated with each key group input connection for identifying positive and negative key group signals and distinguishing key representation presses from key representation releases;

a pair of mouse-click buttons mounted on said housing;

a mouse position recognizer mounted within said housing, said mouse position recognizer including first means responsive to said imaging signals for generating a mouse position signal, and second means responsive to activation of said mouse-click buttons for generatating a mouse-click signal;

retractable legs mounted on said housing for preventing said housing from rolling during use of said flexible keyboard; and means for generating sounds in response to a user pressing one of said key representations.

* * * * *